Oct. 16, 1923.

J. HENKE

SMOKESTICK

Filed Feb. 28, 1923

1,471,127

Inventor

John Henke

By Chamberlain & Newman
Attorneys

Patented Oct. 16, 1923.

1,471,127

UNITED STATES PATENT OFFICE.

JOHN HENKE, OF NEW HAVEN, CONNECTICUT.

SMOKESTICK.

Application filed February 28, 1923. Serial No. 621,768.

*To all whom it may concern:*

Be it known that JOHN HENKE, a citizen of the United States, and a resident of New Haven, in the county of New Haven and State of Connecticut, has invented certain new and useful Improvements in Smokesticks, of which the following is a specification.

This invention relates to new and useful improvements in smoke sticks, upon which to hang frankfurters and various other forms of sausages, and cuts of meat to be smoked.

Heretofore solid wooden sticks have been used very extensively as a smoke stick for frankfurters, and I find that by the use of the same that portion of each frankfurter that lies upon or against the stick so as to be protected thereby, fails to become smoked and cured as does the rest of the frankfurter, and thus produces light spots or blotches upon the frankfurter at that place, making of it a spotted frankfurter, so to speak, and less attractive than if its entire surface were cured alike.

It is also a fact that when in use and after lying around for a few days this particular portion of the frankfurter which was not smoked and was formerly of a relatively lighter color, is the first to begin to spoil and turns a dark greenish color, which of course affects the sale of the article.

It is therefore the object of my invention to provide a smoke stick of suitable proportions and strength to carry the usual weight of ten pounds, the customary amount now hung upon smoke sticks, and to construct the same in a manner to properly support the frankfurters in spaced relation one to the other and especially to hang them so a very small part of a few of the frankfurters only will be protected from the smoke, thus insuring a uniform curing and coloring of the entire surface of each and all of the frankfurters supported thereby.

A further object of the invention is to design the same of metal, principally of round wire rods, cut in suitable lengths and assembled so that the smoke may readily circulate around the same as well as around the frankfurters when supported thereon.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Figure 1:
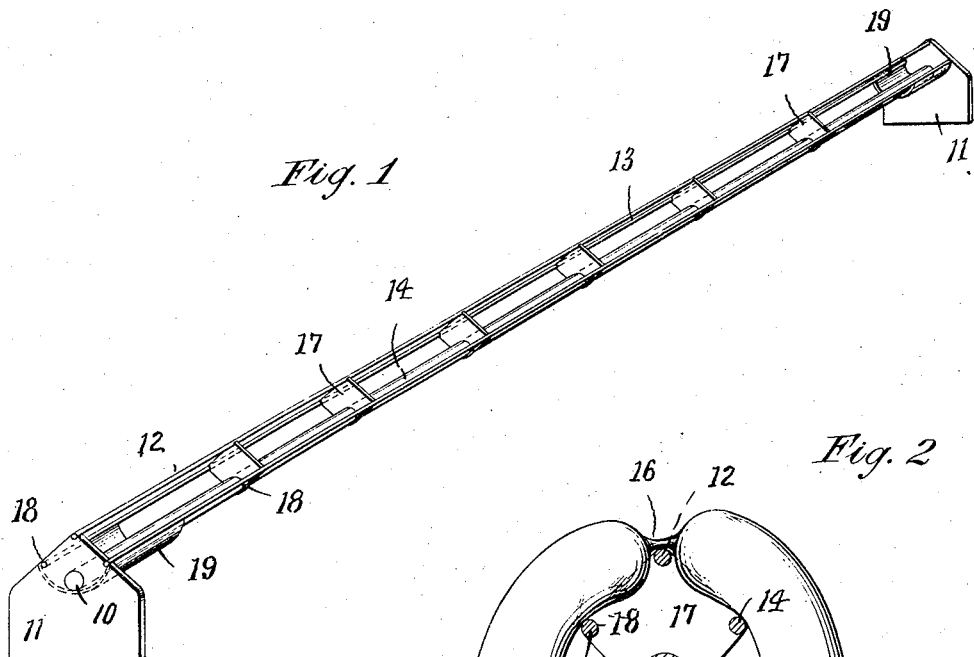
Figure 2:
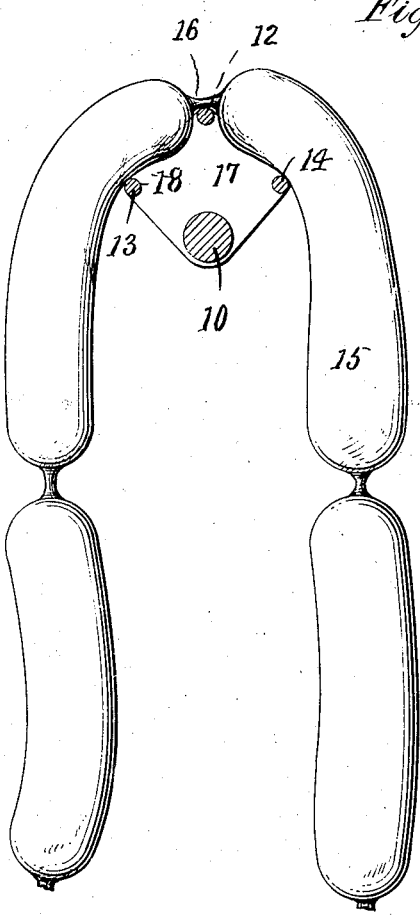
Figure 3:
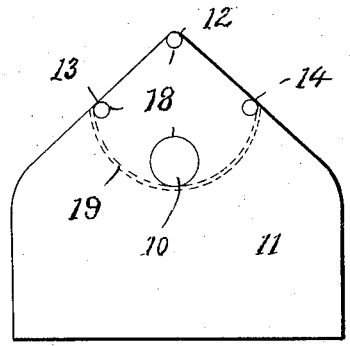

Similar characters of reference denote like or corresponding parts throughout the several figures of the accompanying drawings forming a part of this specification, and upon which, Fig. 1 shows a perspective view of my improved smoke stick;

Fig. 2 is a cross section of the construction shown in Fig. 1, illustrated on an enlarged scale and including a bunch of frankfurters hung thereon; and Fig. 3 shows an end view of the stick shown in Fig. 1.

The improved smoke stick as will be noted consists of a structure made up of a series of longitudinal rods arranged in spaced relation to each other and rigidly supported in such relation by intermediate bridge pieces that are secured between the rods, and positioned at suitable distances from the other to properly brace the structure and enable it to carry the load to be supported thereon.

Referring in detail to the characters of reference marked upon the drawings, the device as will be seen comprises four longitudinal rods, three of which may be of the same diameter and the fourth somewhat larger to form the heavier member of the stick. This heavier rod which I have indicated as 10, is the lowermost one in the group and has each of its two ends secured in an end supporting plate 11, which preferably have a straight bottom edge portion to rest upon a shelf or ledge of a smoke house, not shown, so that the sticks may be suitably supported thereon above the smoke fire used in the smoke house for smoking the meat.

12 represents the uppermost one of three small rods and 13 and 14 indicate side rods which may be of the same size as the top rod and spaced at equal distances therefrom and at substantially the same distance from the lower rod. These side rods are thus positioned below the top rod and spaced not only from it but positioned at a distance, horizontally speaking, from each other so that when a coupled pair of frankfurters 15 are hung from the stick, as shown in Fig. 2, the reduced connected portion 16 of the casing will engage the top rod and the under portion of the upper end of the two adjoining frankfurters will lightly engage the side rods 13 and 14 in a way to support them in their depending position, hanging in such a manner as to be entirely free of the frame except as engaged on the smaller rods and out of touch with one another, so as to permit a free circulation of smoke and heat around the entire surface of the frankfurter case.

The several rods referred to are further provided with intermediate pieces 17 which may be of sheet metal, each having pockets 18 formed in their edge portions to receive the said rods and wherein they may be secured by means of soldering, so as to secure the same to the rods at spaced intervals and in a way to uniformly support and brace the rods in longitudinal relation properly spaced one from the other so as to allow the smoke to freely circulate therebetween.

At each end of the stick I also provide a sheet metal trough-like member indicated by 19, one end of which is secured to the inner side of the end supports and the top edges attached to the side rods, while the inner bottom portion of the trough is in engagement with the under side of the bottom rod 10. This member serves as a brace as between the rods proper and the end plate 11 and besides constitutes a bearing portion of the stick which may serve to engage and rest upon a beam or part of a smoke house or other structure upon which the end supports of the stick would not be so well adapted to engage.

Having thus described my invention, what I claim and desire to secure by Letters Patent is—

1. A series of longitudinally disposed rods arranged in rectangular relation and one of the rods forming the uppermost portion of the angle, another one the lowermost portion and the remaining two rods the opposite side portions, means for tying together and supporting the rods in said relative position, and end supporting pieces secured to the said rods to provide a support for the end portions of the stick.

2. A smoke stick comprising a series of longitudinally arranged rods, a series of spaced supports arranged intermediate of said rods to hold the same in spaced relation; supporting plates secured to the ends of the rods retaining the same in fixed relation to each other, a brace and bearing member secured as between the end plates and the rods one of the said rods being positioned above the others and two of said rods being arranged in spaced relation beneath and at opposite sides of the said upper rod.

3. A smoke stick comprising a series of longitudinally arranged rods, a series of spaced supports arranged intermediate of said rods to hold the same in spaced relation, supporting plates secured to the ends of the rods retaining the same in fixed relation to each other, a brace and bearing member secured as between the end plates and the rods, one of the said rods being positioned above the others and two of said rods being arranged in spaced relation beneath and at opposite sides of the said upper rod and an additional rod also arranged below the upper central rod engaged by the said intermediate and end supports.

4. A smoke stick comprising a single portable unit and formed of several parts including a series of longitudinally disposed rods arranged in spaced relation having their ends secured to a supporting member, and intermediate parts positioned between said rods at suitable intervals to brace the same, one of the said rods being positioned above the others and two of the said rods being positioned in spaced relation below the above mentioned rod and to opposite sides thereof.

Signed at Bridgeport in the county of Fairfield and State of Connecticut this 27th day of February, A. D. 1923.

JOHN HENKE.

Witnesses:
C. M. NEUMAN,
A. OSWALD PULLMAN.